United States Patent [19]

Benson

[11] Patent Number: 5,720,681

[45] Date of Patent: *Feb. 24, 1998

[54] TORQUE RESPONSIVE ACTUATION DEVICE

[76] Inventor: Steven R. Benson, 5919 S. 350 West P.O. Box 57547, Murray, Utah 84157

[*] Notice: The term of this patent shall not extend beyond the expiration date of Pat. No. 5,516,333.

[21] Appl. No.: 618,259

[22] Filed: Mar. 18, 1996

[51] Int. Cl.$^6$ .................................................. F16D 43/20
[52] U.S. Cl. ........................ 474/10; 474/21; 192/54.52; 192/93 A
[58] Field of Search .......................... 474/8, 10, 17, 474/19, 21; 192/54.52, 93 A; 384/58

[56] References Cited

U.S. PATENT DOCUMENTS

| | | | |
|---|---|---|---|
| 3,195,364 | 7/1965 | Pauli | 474/19 |
| 3,722,308 | 3/1973 | Steurer. | |
| 4,173,155 | 11/1979 | Togami et al. | |
| 4,378,221 | 3/1983 | Huff. | |
| 4,523,917 | 6/1985 | Schildt | 474/19 |
| 4,585,429 | 4/1986 | Marier. | |
| 5,403,240 | 4/1995 | Smith et al. | |
| 5,516,333 | 5/1996 | Benson | 474/19 |

Primary Examiner—Roger J. Schoeppel
Attorney, Agent, or Firm—M. Reid Russell

[57] ABSTRACT

The invention is in a torque responsive actuation device, preferably for a belt drive system as is commonly utilized with snowmobile and like type vehicles. A bearing carrier of the invention is connected to a lower half of a split pulley, with the upper pulley half mounting a helix or cam cone that extends towards the carrier undersurface and includes a plurality of cam tracks formed therein that are each to receive a cam follower for travel therealong. Movement of the bearing carrier towards the top face of the pulley upper half is thereby translated to lower the pulley half to spread the pulley upper and lower halves apart, opening a V slot therebetween wherein a drive belt is maintained. A cylindrical shaft is journaled through the bearing carrier and fitted through the pulley that includes a coil spring disposed therearound for providing spring biasing to urge the bearing carrier away from the pulley upper half, biasing the pulley halves together. To provide minimum friction operation and wear the invention employs cam follower bearings as the cam followers and radiuses either the outer surface of rollers of each cam follower bearing or of the cam tracks to be convex and to have an apex that contacts and rolls along a center line of the opposing surface, the roller of each bearing to travel through a variety of cam angles during operation of the torque responsive actuation device.

7 Claims, 6 Drawing Sheets

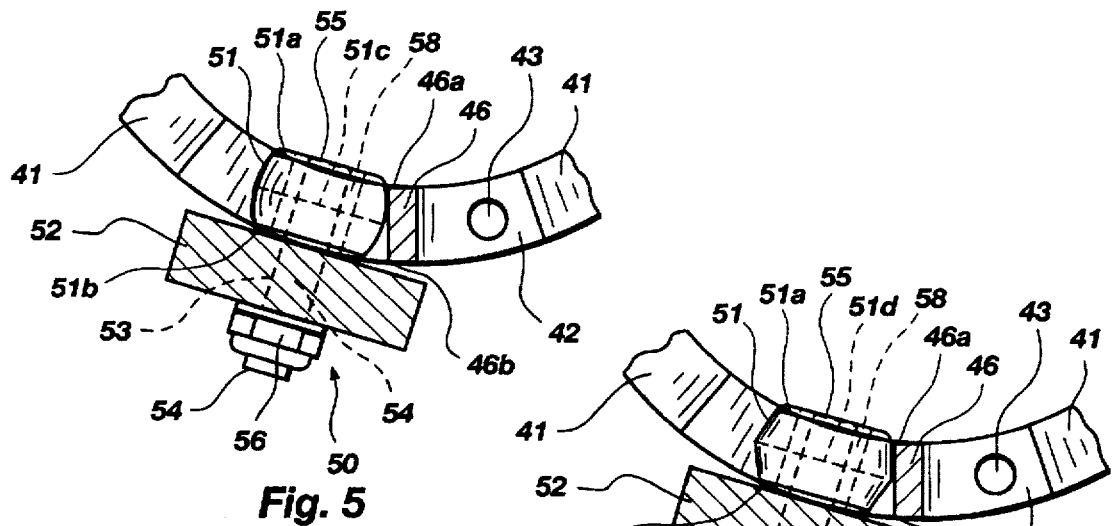
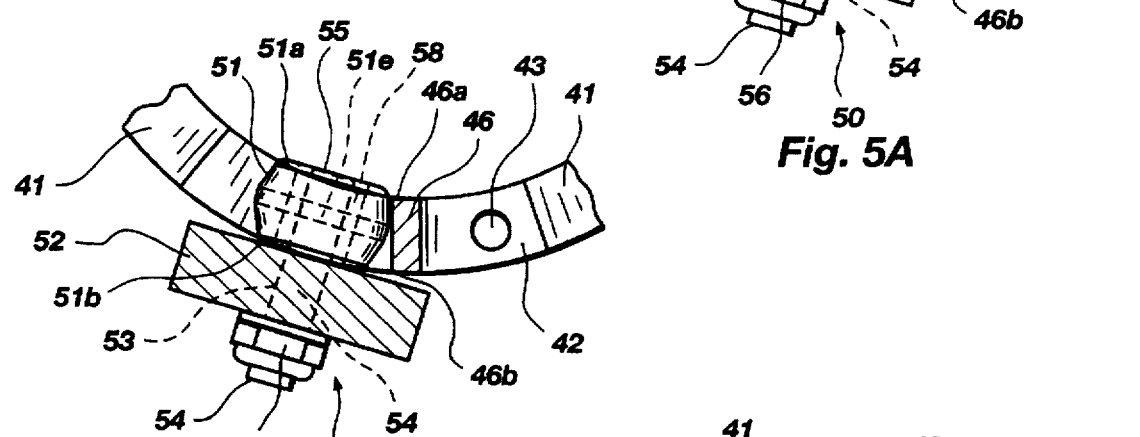
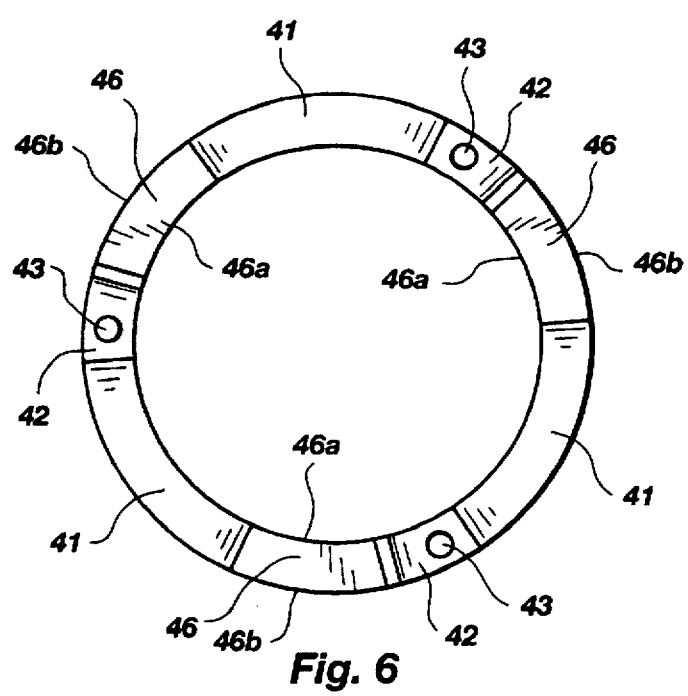

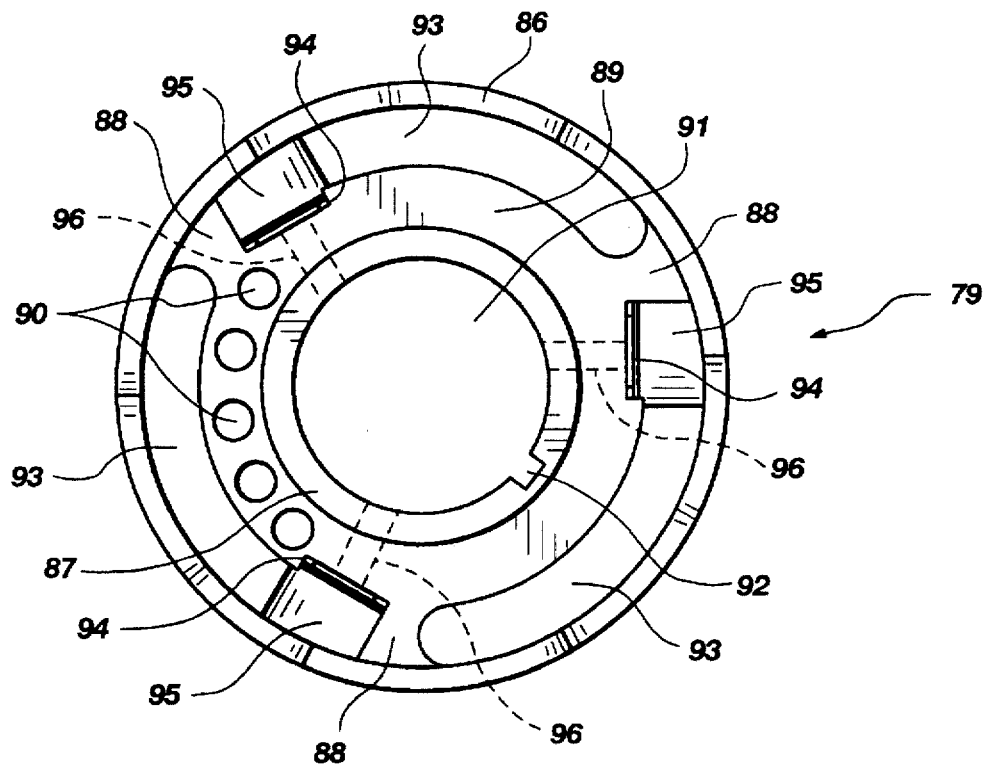
Fig. 8
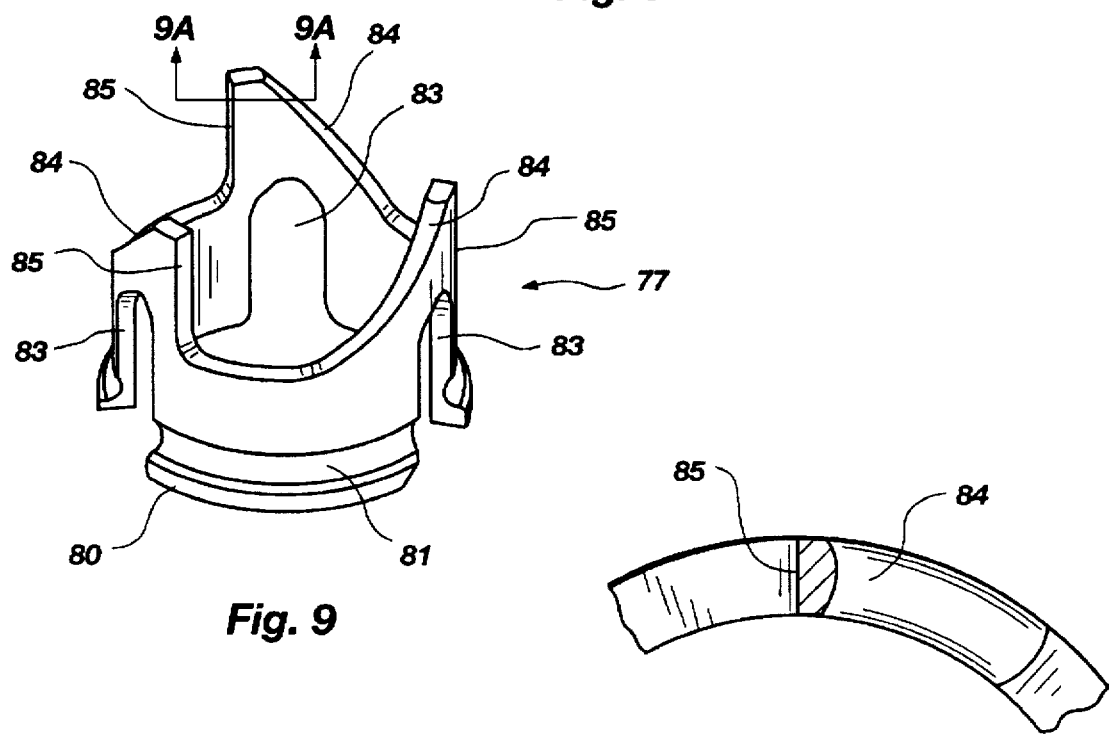
Fig. 9
Fig. 9A

TORQUE RESPONSIVE ACTUATION DEVICE

BACKGROUND OF THE INVENTION

1. Field of the Invention

This invention relates to clutch type systems and in particular to a torque responsive actuation devices that include roller bearings arranged to travel along helix tracks to open and closing opposing pulley halves for a belt driven power train as is commonly used for snowmobiles, and the like.

2. Prior Art

The present invention is in a torque responsive actuation device that incorporated bearings arranged travel along helix tracks, functioning as a clutch for a belt driven power train. The invention improves upon prior systems by providing for radiusing either the bearing or track whereon it travels, the bearing to travel along a center line of the helix track, with bearing travel to spread apart pulley halves wherearound a continuous drive belt is positioned. The pulley opening is matched by closure of a drive clutch. So arranged, based upon engine speed, the one clutch will open its pulley, thereby reducing the radius of pulley that the belt travels around, as the other clutch closes its pulley, thereby increasing the pulley radius. The belt is tightly maintained within the pulleys with changes in applied torque producing changes in the radiuses of the respective clutch pulleys.

Examples of earlier devices for varying pulley diameter responsive to torque are shown in U.S. Patents to: Steurer, U.S. Pat. No. 3,722,308; Togami, et al No. 4,173,155; Huff, U.S. Pat. No. 4,378,221; Marier, U.S. Pat. No. 4,585,429; and Smith, et al, U.S. Pat. No. 5,403,240. The desirability of decreasing friction and diminishing binding between bearings and the helix tracks whereon they travel was recently recognized in a patent application of the present inventor, entitled "Torque Responsive Actuation Device for a Belt Drive System" U.S. patent application Ser. No. 08/323,611, filed Oct. 17, 1994, now U.S. Pat. No. 5,516,333 that the present invention improves upon.

In applicant's earlier patent application, only the helix cam tracks that individual roller bearing travel along were shown radiused, each presenting a convex surface thereal-ong. These curved surfaces provide for centering the roller of each roller bearing as it rolls therealong, providing for a very smooth clutch upshift and backshift relative movement with less component wear than earlier clutch arrangements experience. The present invention further recognizes that any torque sensing type of clutch arrangement that utilizes a bearing a cam can include a radiusing of either of the opposing bearing or helix surfaces to obtain the benefits as set out in the above cited U.S. Patent Application.

SUMMARY OF THE INVENTION

It is a principal object of the present invention in a torque responsive actuation device to provide a torque sensing system that is operated to produce near frictionless pulley ratio shift changes.

Another object of the present invention is to provide a torque responsive actuation device that is easily operated and provides a high degree of torque sensitivity and efficiency so as to allow for quick and precise upshifting and backshifting.

Another object of the present invention is to provide a torque responsive actuation device with bearings that travel along individual tracks of track sections of a helix or cam cone, with either opposing bearing or track surface to have a convex surface with a greatest diameter of the convex surface preferably at the surface center so as to provide a point contact between the bearing surfaces that will remain centered during travel of the one surface over the other.

Still another object of the present invention is to provide a torque responsive actuation device where either of the opposing bearings or track surfaces have convex surfaces formed thereacross.

Still another object of the present invention is to provide a torque responsive actuation device for use in belt driven vehicles, such as snowmobiles, or the like, where either of the individual roller bearing contact surfaces are radiused thereacross that each engage and roll along the center of a track, through a variety of cam angles as could otherwise create side loads on the bearings, thereby providing a torque responsive actuation device that will exhibit easy, smooth, efficient and essentially frictionless shifting over a long service life.

In accordance with the above objects the present invention is in a torque responsive actuation device as for example, for a belt drive system that includes a pulley formed from upper and lower halves that, when fitted together, form a deep V therebetween that receives a drive belt disposed therein.

For the invention, bearings, as set out below, are arranged to travel along each of a plurality of cam tracks, spreading apart pulley halves to function as a clutch. With each bearing roller centered on the cam track as it rolls therealong, avoiding track edge wear and a possibility of a bearing roller binding at the track edge from side loads, to provide bearing roller centering, either the roller surface or the track surface is radiused thereacross, or includes a center triangular pack therealong. The radius or height of the surface is selected such that the roller traveling along the track will follow a path along the track center throughout a variety of cam angles. Though, it should be understood, the invention can be in any clutch type device where opposing bearing surfaces are fitted together with rollers, or the like, to travel along tracks. In which arrangements, either the roller or track surfaces are provided with a radiused surface or apex to provide point contact therebetween that will remain centered during travel.

In a first embodiment, an upper pulley half includes a center hole and with spaced holes wherethrough piers from the lower pulley half extend. The piers are equally spaced radially from the lower pulley half center and project past the upper pulley half top surface. Also mounted to extend upwardly from the upper pulley half top face is a cylindrical helix or cam cone that includes at least three identically equal spaced helix or cam sections formed therein. The helix or cam sections are each equally spaced radially from the upper pulley half center. The identical helix or cam sections are preferably formed by appropriately machining a metal cylindrical section to leave a flat bottom surface that is arranged to be mounted to the upper pulley half top surface such that the helix or cam cone extends at approximately a right angle outwardly therefrom.

Each helix or cam section includes a cam track formed from a lower corner at the junction of a cylinder ring bottom end and upper pulley half top face, and extending straight across the cylinder segment to an upper distant corner thereof. Each cam track is angled upwardly from the pulley half upper face, and is formed to be flat thereacross.

The preferred roller bearings for this embodiment are preferably three individual sealed needle bearing that are each journaled to extend at right angles from the side of posts that are each themselves secured at equal spaced radial intervals to extend outwardly from an actuation or clutch cover plate assembly undersurface. The posts are each adjacent to an arcuate slot that has been formed through the actuator or clutch cover plate wherethrough the helix of cam cone track sections project when the clutch cover plate undersurface is moved towards the pulley half upper face. The clutch cover plate is guided on a cylindrical shaft that is journaled, at a right angle, through a bushing that is maintained in a center hole of the clutch cover plate and a hole formed through the pulley center.

For a second embodiment roller bearings are maintained across cavities of a cylindrical bearing carrier, rolling along tracks of a helix or cam cone. As with the first embodiment, the helix or cam cone is mounted to, to extend upwardly from, the clutch cover plate under surface, with the cylindrical bearing carrier function like the clutch cover plate and is guided, like the clutch cover plate, on the cylindrical shaft.

For both embodiments, the cylindrical shaft is secured to the upper pulley half and is journaled through and extends beyond the lower pulley half, with clutch cover plate, cylindrical bearing carrier movement towards the upper pulley half top face to separate the upper and lower pulley halves to operate the torque responsive actuation device of the invention.

To urge the clutch cover plate cylindrical bearing carrier and upper pulley half apart, a coil spring is preferably disposed over the cylindrical shaft with the spring ends contacting the opposing clutch cover plate, cylindrical bearing carrier undersurface and upper pulley half top face, biasing them apart. This biasing is overcome by moving the clutch cover plate, cylindrical bearing carrier towards the upper pulley half, thereby separating the pulley halves, to open the pulley V, reducing the radius thereof.

THE DRAWINGS

The following drawings illustrate that which is presently regarded as the best mode for carrying out the invention:

FIG. 5 is a top sectional view taken along the line 5—5 of FIG. 4 showing the flat surface of the helix or cam track and showing a radiused cam follower roller journaled on an axle, shown in broken lines, so as to extend outwardly from an upright post of the actuator cover plate;

FIG. 5A is a view like that of FIG. 5 only showing the cam follower roller having a center apex with equal flat sides sloping downwardly therefrom to the roller sides;

FIG. 5B is a view like that of FIG. 5A only showing the cam follower roller as having been flattened below the apex;

FIG. 6 is a top plan view of the helix or cam cone of FIG. 4;

FIG. 8 is an enlarged bottom plan view of the cylindrical bearing or carrier of FIG. 7;

FIG. 9 is an enlarged side elevation perspective view of the helix or cam cone of FIG. 7; and FIG. 9A is an enlarged sectional view taken along the line 9A—9A of FIG. 9.

DETAILED DESCRIPTION

Figures 1, 3:
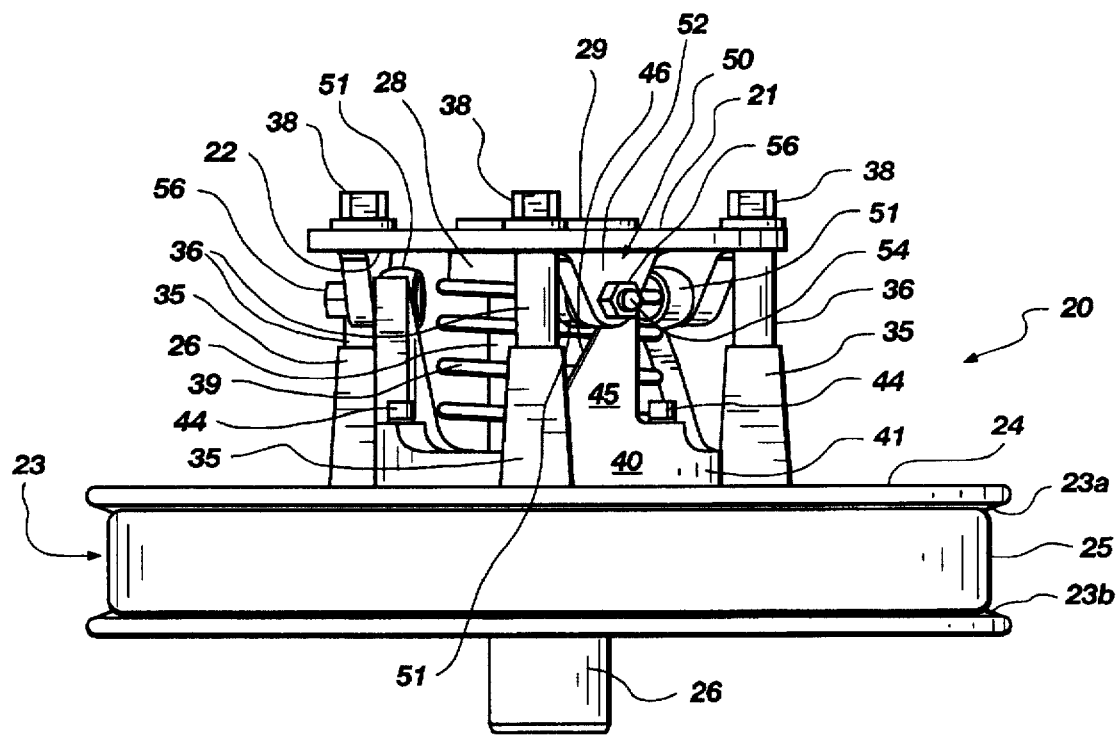
FIG. 1 is a first embodiment of a torque responsive actuation device of the present invention, showing upper and lower pulley halves closed together with a drive belt maintained therebetween.
FIG. 3 is a bottom plan enlarged perspective view of the actuator cover plate assembly of the torque responsive actuation device of FIGS. 1 and 2.
Figure 2:
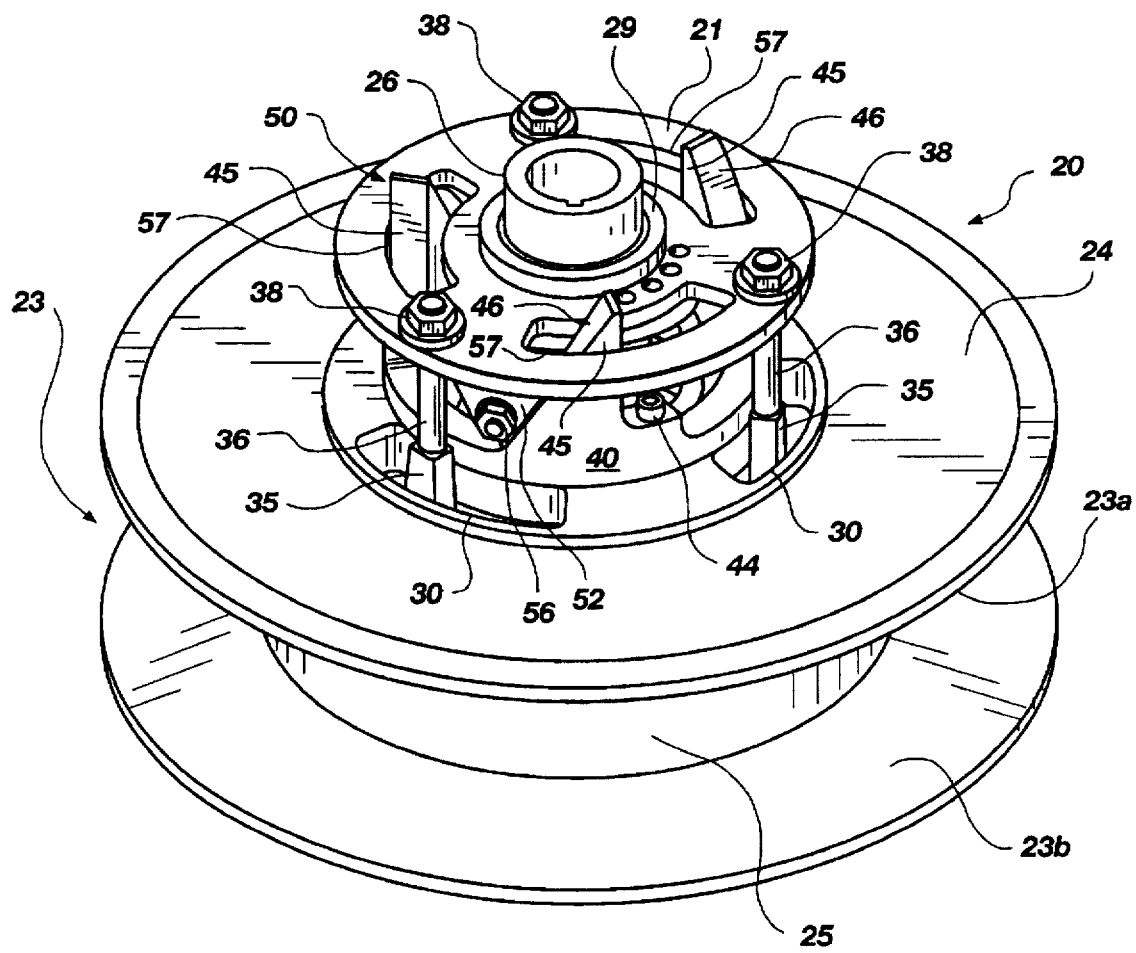
FIG. 2 shows the torque responsive actuation device of FIG. 1 as a top plane perspective view to illustrate the operation thereof where an actuator cover plate assembly is moved toward an upper pulley half top face, thereby moving a lower pulley half away from which upper pulley half, opening a V formed between which pulley halves.

FIGS. 1 and 2 show side elevation and top plan perspective views of a first embodiment of a torque responsive actuation device 20 of the invention, hereinafter referred to as actuation device 20. While the actuation device 20 is a significant departure from earlier driven clutch assemblies, its functions are similar to my earlier U.S. Patent Application for "A Torque Responsive Actuation Device for a Belt Drive System" Ser. No. 08/323,611 now U.S. Pat. No. 5,516,333. Unique therefrom, however, is the configuration of the respective cam follower bearing rollers and the cam tracks wherealong the rollers travel, as set out and described herein. According, it should be understood, the description of the Torque Responsive Actuation Device of the above cited U.S. Patent Application, and its functioning should be taken as a description appropriate to the actuation device 20 of the present invention, and accordingly the disclosure of this U.S. patent application Ser. No. 08/323,611 now U.S. Pat. No. 5,516,333, is incorporated herein by this reference. Similar to the above cited U.S. Patent Application, the first and second embodiments of the present invention include configuration of cam follower bearings that each include a roller type device arranged for traveling along a helix or cam track. The configuration of the roller surfaces or helix or cam track of the earlier patent application and present invention are to provide for minimizing wear and friction between components and to preclude roller binding due to side loads as occur when a roller travels to a track edge.

As with my earlier U.S. patent application Ser. No. 08/323,611 now U.S. Pat. No. 5,516,333, for the actuation device 20, individual actuator cover plate helix or cam track wear and roller binding are dramatically improved by providing for a radiusing of each bearing, as shown best in FIGS. 3, 4 and 5, to form a convex surface thereacross. Which convex surface to have a greatest height at the bearing center, to guide bearing travel along the center of the flat cam track, as shown in FIG. 5. The roller center is thereby maintained equidistant from the track edges. Heretofore,. earlier arrangements, involved bearing and cam track surfaces that were both flat with a path of travel of each clutch plate roller, or, as in earlier arrangements slides, was from one cam track edge to the other, creating side loads on the bearing or slides during operation as the bearing or slide traveled through the varied cam angles during travel over the cam track. Such side loads produced unequal roller or slide and cam track wear as the roller changed position through varied cam angles during its travel from one cam track side to the other, often causing bearing binding and damage. Such earlier clutches, are both stiff and hard to operate and have required frequent repair to replace worn slides or roller bearings. Distinct therefrom, the present invention provides an actuation devices that provide smooth and easy operation, exhibit a minimum of wear on cam follower bearing rollers, and provide for a quick shifting at essentially a zero over-rev condition. Further, as individual roller travel of the present invention remains centered longitudinally along a cam track, side loads on each cam follower roller as are present at the track edges that may cause roller binding and damage are negated.

The actuation device 20, as shown in FIGS. 1 and 2, includes an actuator cover plate 21, that is shown inverted in FIG. 3 from its arrangement in FIGS. 1 and 2. As shown best in FIG. 2, the actuator cover plate undersurface 22 is essentially parallel to an upper or top face 24 of an upper pulley half 23a of a pulley 23. The pulley 23 consists of upper and lower pulley halves 23a and 23b, respectively, that have, when closed together, a deep V that a drive belt 25 will fit into. To provide pulley separation, reducing the pulley effective radius relative to the drive belt 25 the lower pulley half 23, as shown in FIG. 2, includes three piers 35 that are each secured to a hub area, at equal spaced intervals and equal radial distances from the lower pulley half center, and extend through arcuate openings 30 that are formed through the upper pulley half 23a hub area. The piers 35 each include a rod 36 extending axially from the top surface, that, in turn, are each fitted through holes 37 formed through the actuator cover plate 21. The holes 37, as shown in FIG. 3, are each stepped outwardly into flat ledge 37a, and the rod 36 ends are stepped inwardly into a flat shoulder. So arranged, each rod shoulder fits against a hole ledge, and a rod end that extends through the hole 37 is threaded to receive nut 38 turned thereover, for mounting the actuator cover plate 21 onto rods 36, as shown in FIGS. 1 and 2. The actuator cover plate 21 also includes a center hole 28 wherein a bushing 27 is shown fitted. The bushing 27 is to support travel of a straight cylindrical shaft 26 between the attitudes shown in FIGS. 1 and 2. As shown, the straight cylindrical shaft 26 extends, at a right angle from the actuator cover plate 21 undersurface 22, and is fitted through a center hole of the pulley 23. The cylindrical shaft 26 is secured to the upper pulley half 23a to slide through the lower pulley half 23b.

The cylindrical shaft 26, as set out above fitted through the center bushing 27 is maintained in center hole 28 formed through the actuator cover plate 21 to allow the cylindrical shaft to turn or pivot relative to the actuator cover plate 21 during actuator device 20 operation. This allows for actuator cover plate 21 pivoting or turning between the attitudes shown in FIGS. 1 and 2.

Movement of the actuator cover plate 21 towards the upper pulley half 23a top face 24 is transferred through the connecting rods 36 and piers 35 to the lower pulley half 23b so as to move the pulley 23 halves apart, spreading the pulley V. While the actuator cover plate 21 of FIGS. 1 through 3, appears to be like and to function like the actuator cover plate of my earlier cited U.S. Patent Application, it should be understood that rollers 51, as shown best in FIG. 5, are unique and distinct as set out and described hereinbelow.

In both the present and my earlier U.S. patent application the actuator cover plate is moved towards the upper pulley half 23a top face 24. To provide for actuator cover plate and lower pulley half movement, the present invention and my earlier U.S. patent application both include the radial equally spaced parallel piers 35 that are each secured to extend at right angles upwardly from the hub area of the lower pulley have 23b, and pass through arcuate holes 30 formed in the upper pulley half 23a. The piers 35 each include the smooth walled cylindrical rod 36 that extends axially from each pier top end. The cylindrical rods 36 are to fit through that holes 37 that are formed at radial spaced intervals through the actuator cover plate 21, as shown best in FIG. 2. So arranged, the actuator cover plate 21 is maintained to the lower pulley half 23b and will slide up and down along cylindrical shaft 26 pivoting or turning relative to the cylindrical shaft 26, when traveling between the attitudes shown in FIGS. 1 and 2, to open the pulley 23, as described above.

With the actuator cover plate 21 secured onto each of the connected rods 36, as set out above, a coil spring 39 is provided to bias the actuator cover plate 21 outwardly, as shown in FIG. 1. To provide for the pulley halves 23a and 23b being normally closed together, the coil spring 39 is disposed around the cylindrical shaft 26. So arranged, the ends of coil spring 39 engage, respectively, the undersurface 22 of the actuator cover plate 21 and the top face 24 of the upper pulley half 23a. The coil spring 39 thereby urges the actuator cover plate 21 outwardly to where the halves of pulley 23 are closed together, as shown in FIG. 1. The biasing of coil spring 39 is overcome to urge the actuator cover plate towards the upper pulley half, spreading the pulley 23 V, as shown in FIG. 2.

My cited U.S. Patent Application, and the actuation devices 20 and 70 of the invention all preferably employ a helix or cam cone whereon are formed cam tracks that are each for guiding cam followers. A helix or cam cone 40 of the actuation device is shown best in FIG. 4 and as sections in FIGS. 4A, 4B, 4C, 5, 5A and 5B with a helix or cam cone 77 of the actuation device 70 shown best in FIG. 9, both having been removed from their mounting, respectively, to the top or upper face 24 of the pulley half 23a and a hub of pulley half 72.

Figure 4:
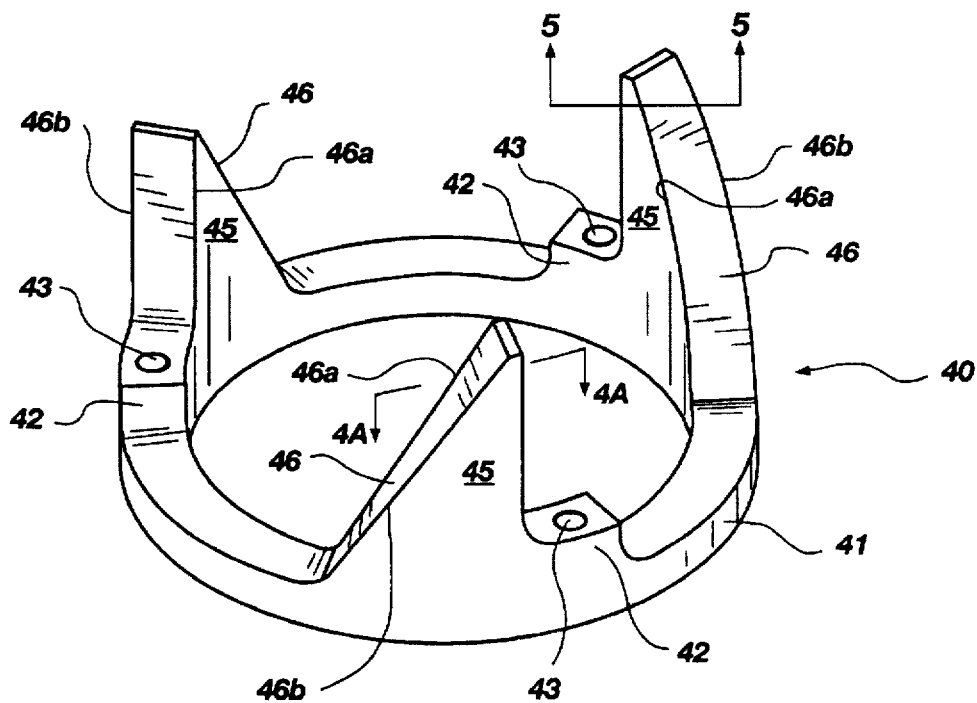
FIG. 4 is a side elevation perspective view of the helix or cam cone of the torque responsive actuation device of FIGS. 1 and 2 removed from its mounting onto the top face of the upper pulley half.
Figure 7:
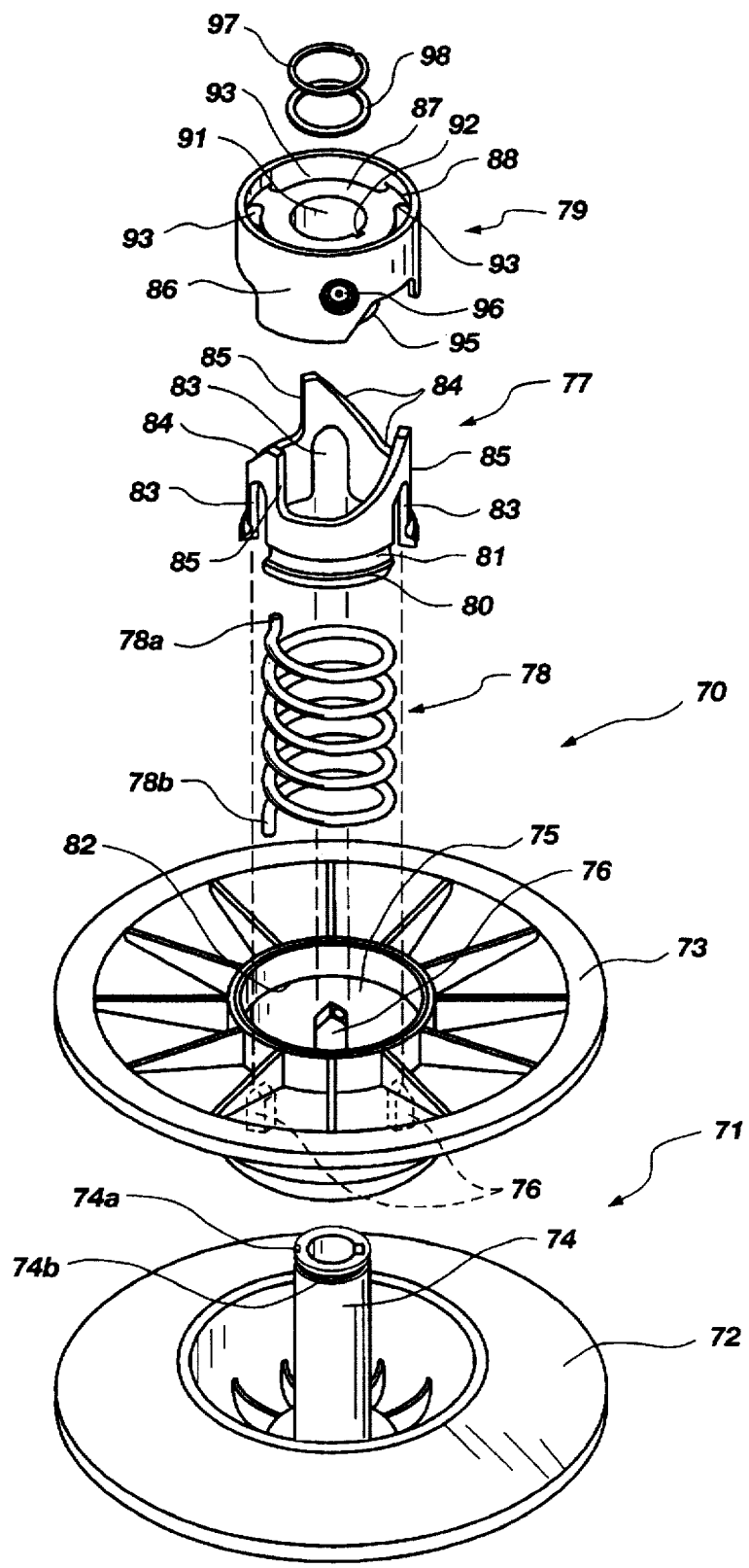
FIG. 7 is an exploded side elevation perspective view of a second embodiment of a torque responsive actuation device of the present invention showing upper and lower pulley halves separated with a helix or cam track shown aligned for fitting to an upper pulley half, and with a cylindrical bearing carrier aligned with a coil spring and cylindrical shaft for mounting to a lower pulley half.

Each helix or cam cone 40, shown in FIGS. 4 and 6, and 72 shown in FIGS. 7 and 9, is preferably formed from a metal cylinder wherefrom sections of material are removed to leave for the helix or cam cone 40, a base ring 41 that includes a flat bottom surface and a mounting slot, respectively. The base ring 41 is stepped outwardly at equal radial points along a top surface thereof into spaced platforms 42 wherein are formed straight bolt hole 43 that extend therethrough. The bolt holes 43 are each to receive a bolt 44, shown in FIGS. 1 and 2, fitted therethrough. The bolts 44 are turned into holes, not shown, that have been formed in the upper or top face 24 of the upper pulley half 23a, mounting the helix or cam cone 40 thereto. Adjacent to each platform 42, the helix or cam cone is stepped outwardly into a cam section 45 that, as shown best in FIGS. 4 and 6, is essentially a right triangle and includes a straight cam track 46 as the right triangle hypotenuse side.

Figure 4A:
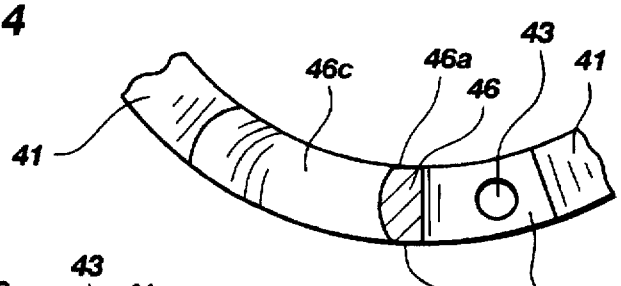
FIG. 4A is a top plan sectional view taken along the line 4A—4A of FIG. 4 showing the helix or cam track as radiused.
Figure 4B:
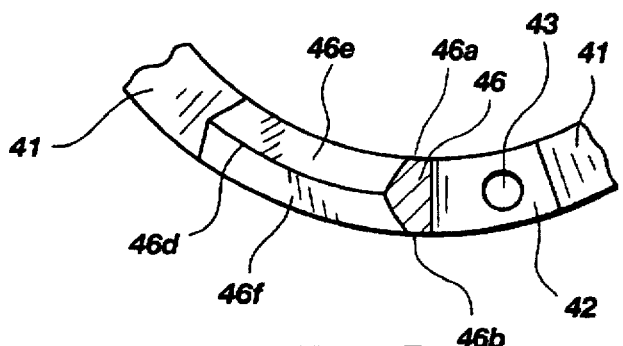
FIG. 4B is a view like that of FIG. 4A only showing the helix or cam track as having a center apex with equal flat sides sloping downwardly therefrom to intersect cam section sides.
Figure 4C:
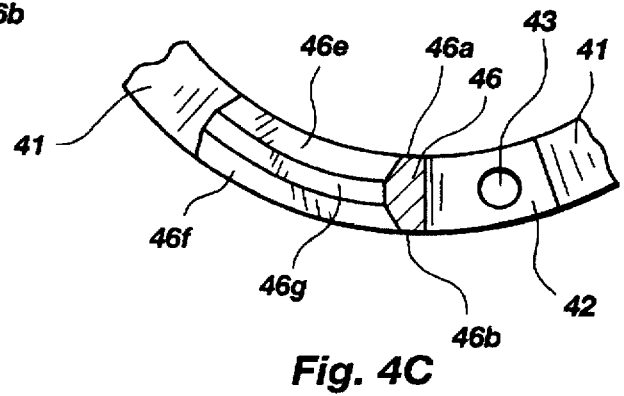
FIG. 4C is a view like that of FIG. 4B only showing the helix or cam track as having been flattened below the apex.

Each cam track 46 of the actuator device 20 is flat between the edges thereof and in FIG. 4 and is radiused at 46c in FIG. 4A has a center apex 46d with downwardly sloping sides 46e and 46f extending therefrom to intersect cam track edges 46a and 46b in FIG. 4B, and shows, in FIG. 4C, the apex as having been milled, of otherwise formed, into a flat surface 46g. The respective track 46 surfaces of 4, 4A, 4B and 4C to receive the roller 51 of a cam follower roller bearing 50 positioned for travel therealong. In this embodiment, each track is to receive a convex outer surface of roller 51 of FIG. 5, or an apex 51d of a surface of roller 51, as shown in broken lines in FIG. 5A, or a flattened apex 51e of a surface of roller 51, shown in broken lines in FIG. 5B. For which convex surface, the greatest diameter of cross section of the roller 51 is to be positioned at the center of the cam track 46 between edges 46a and 46b thereof, and is to travel along the cam track center as it rolls up and down therealong. Accordingly, the radius of the convex curved 51c, apex 51d or flatted apex 51c surface of each roller 51 preferably has a greatest diameter at the roller lateral center 51c, shown in broken lines in FIGS. 3 and 5, with apex 51d and flattened apex 51e shown in broken lines in FIGS. 5A and 5B, respectively and curves or slopes uniformly therefrom to the roller 51 ends 51a and 51b. It should be understood, however, that the roller 51 greatest diameter can be at a location therealong other than the center 51c, within the scope of this disclosure. The determination of the preferred location of the roller surface greatest diameter 51c, 51d or 51e, is to position it between track 46 inner and outer edges 46a and 46b, respectively, to provide a path of travel of a roller 51 of a cam follower bearing 50 that will remain centered on the cam track 46 along its entire path of travel. For the center of roller travel along the length of track 46 to be equidistant from the cam track edges 46a and 46b, the radius of the helix or cam cone 41 and the roller 51 are selected such that a roller 51 an appropriate radius of curvature is provided for the roller surface taking into account the varied cam angles that the cam follower roller will experience as it travels therealong.

For the actuation device 20, the selection of a surface radius for the roller 51 convex curve is based on the cam track 46 slope that, of course, is also a helical curve that follows the curve of the helix or cam cone 40. The cam track 46 may be formed to have from a thirty degree (30°) to seventy degree (70°) slope and that slope may itself vary along the track length. Shown herein, the track 46 has approximately a fifty degree (50°) slope. For which slope a radius of curvature of the roller 51 surface of approximately one (1) inch was selected for a track width of 0.325 inches and less, thereby producing, at the roller 51 center 51c, an arc with a width of 0.266 inches and a drop of 0.0089 inches from the roller center to its ends 51a and 51b. This drop of 0.0089 inches is preferred for any cam track slope as set out above, with the roller 51 radius to be selected accordingly.

As set out above, as an alternative arrangement to the actuation device 20, the roller 51 surface can be formed to have opposing equal flat sloping sides that slope together at an apex 51d or flattened apex 51e, as along the roller center 51c. Like the selection, as set out above, of the radius for a particular slope of track 46, taking into account that the track is also a helical curve, the slope of roller 51 sides is selected to provide an apex 51d or flattened apex 51e at the roller 51 center 51c, or at a location thereacross, such that the roller 51 will roll smoothly along the track 46 center line during actuation device 20 operation. Accordingly, for the actuation device 20, it should be understood that the individual rollers 51 surfaces can be radius or can be formed with opposing sloping sides that meet in an apex, or the like, as described. A roller contact surface is thereby provided to center the roller along the cam track length precluding application of side loads on the cam roller bearing 50 through roller 51 as it travels therealong.

For the actuation device 20, each cam follower bearing 50 that includes the roller 51, as shown best in FIGS. 3 and 5 and described above, is shown as mounted on to a shaft 54. Each shaft 54 is fitted through each of three posts 52 that extend at right angles outwardly at equidistance radial distance intervals from one another around the center of the undersurface 22 of the actuator cover plate 21. Each post 52, as shown, is preferably formed as a flat section having a regular pyramid profile is connected to the actuator cover plate undersurface along its base and has a rounded apex that includes a hole 53 formed therethrough, as shown best in FIG. 5, that receives a shaft 54 fitted therethrough. Each shaft 54 preferably includes a broad flat head end 55, and is press fitted through hole 53 through post 52 to receive a connector 56 fitted thereover. The shaft 54 is part of the cam follower bearing 50, that includes roller 51 and is journaled to turn freely on the sealed needle bearing 58, as shown in broken lines in FIG. 5.

As set out above, and as shown in FIGS. 3 and 5, the roller 51 curved surface will travel up and down along cam track 46, following a center path therealong. The roller 51 is at rest at approximately the top of cam track 46. During actuation device 20 operation, to spread apart the pulley halves 23a and 23b as shown in FIG. 2, as the roller descends along the cam track 46 each cam track top end, that is the apex end of each cam section 45, will pass through one of three arcuate slots 47 that have been formed through the actuator cover plate 21. The arcuate slots 47 are spaced equidistantly apart and are at equal radial distances from the actuator cover plate center. The cam sections 45 are to retract through the arcuate slots 47 when pressure to move the actuator cover plate 21 undersurface 22 towards the face 24 of the upper pulley half 23a is released. The coil spring 39 is provided to return the actuator cover plate 21 to the attitude shown in FIG. 1.

The second embodiment of the actuation device 70 is shown in FIGS. 7 through 9 and 9A. Similar to actuation device 20, in FIG. 7, the actuation device 70 is shown to include a pulley 71 having lower and upper pulley halves 72 and 73, respectively. Like the lower and upper pulley halves 23a and 23b of the actuator device 20, the pulley is to receive a drive belt, not shown, fitted therebetween. With, upon operation of the actuation device 70, the surfaces of the pulley halves will move apart and back towards one another changing the pulley radius that the belt turns around. This provides, like the actuation device 20, for a smooth shifting upon torque sensing, functioning essentially like the actuation device 20.

A cylindrical shaft 74 is mounted axially to extend upwardly from the center of the lower pulley half 73 to pass through a larger center opening 75 that is formed through the upper pulley half 73 hub area. Pulley hub opening 75 includes a plurality of straight pointed fingers 76 that, as set out below, are each for fitting into one of slots 83 formed in a helix or cam cone 77. A coil spring 78 is shown aligned for fitting in the hub opening 75 in the upper pulley half 73 fitted around the cylindrical shaft 74. With a top end 78a of coil spring 78 for engaging the undersurface of a cylindrical bearing carrier 79. In FIGS. 7 and 9, the helix or cam cone 77 is shown to include a lip 80 that is formed around the lower end thereof adjacent to a groove 81 formed around the lower portion thereof. The lip 80 is for fitting, as shown best in FIG. 7, within hub opening 75, of the upper pulley half 73. With the finger 76 to fit the helix or cam cone 77 slots 83. The cam cone 77 is thereby mounted at a right or normal angle from the top surface of the upper pulley half 73. The coil spring 78 is for fitting therethrough and for engaging a lower end of cylindrical bearing carrier 79, as set out hereinbelow.

Like the above described helix or cam cone 40 of the first embodiment, the helix or cam cone 77, as shown best in FIG. 9, includes a plurality of cam tracks 84, shown herein as three tracks. Like the cam tracks 46, the cam tracks 84 are each the hypotenuse side of a right triangle, with a side 85 thereof shown as vertical and the base the cross section extending between the lower ends of which vertical side 85 and the hypotenuse side 84. As shown in FIGS. 7 and 9, the helix or cam cone 77 is preferably formed from a cylinder that is machined appropriately to form the respective hypotenuse and vertical sides 84 and 85, as set out above. For this embodiment, as shown in FIG. 9A, the track surfaces 84 are preferably each radiused, the curvature of which surface is like that set out in applicant's earlier patent application, and is computed, as described above the for radiusing the rollers 51 for the actuation device 20. The track surfaces 84 of the actuation device 70, as set out and described above, provide for maintaining a bearing roller centered during travel therealong.

The tracks 84 are to receive rollers 95 of bearings 94 of the cylindrical bearing carrier 79, as shown in FIGS. 7 and that will therealong. The cylindrical bearing carrier, as shown, 8, is preferably an arrangement of an outer cylinders 86 and an inner cylinder 87 respectively, that are connected by strut sections 88. The strut sections 88 connect into a shelf 89 that extends at a right angle from the inner cylinder 87, as shown best in FIGS. 8 and 9. A plurality of spaced holes 90 are formed in the shelf 89, as needed, for receiving top end 78a of coil spring 78 fitted therein, with the opposite coil spring end 78b for fitting into a hole formed in the hub area of the upper pulley half 73, not shown. The inner cylinder 87 is open therethrough at 91, and includes a longitudinal keyway 92 formed along its length. Curved arcuate longitudinal openings 93 are provided between the opposing surfaces of the outer and inner cylinders 86 and 87 that accommodate the tracks 84 of the helix or cam cone 77. The openings 93 accommodate the helix or cam cone 77 tracks 84 as the move up and down therein, in which movement rollers 95 of bearings 94 engage and roll along the respective track surfaces 84.

The bearings 94, as shown, are mounted between the inner and outer sleeves 87 and 86, respectively, each on a shaft 96, that is shown in broken lines in FIG. 8. Split ring 97 and washer 98 are provide for fitting into a top groove 74b, the split ring 97 to hold the washer 98 against the top surface of the inner cylinder 87 and with the bottom of the inner cylinder connected to the coil spring 78, as set out above. The cylindrical bearing carrier 79 is secured onto the cylindrical shaft 74. To prevent cylindrical bearing carrier pivoting a key, not shown, is fitted between into keyway 74a that is formed in the cylindrical shaft 74, and the keyway 92, prohibiting rotation. So arranged, the vertical movement of the cylindrical bearing carrier 79 moves also the lower pulley half 72 against the biasing of spring 78. Thereby, the roller 95 or bearings 94 traveling down the sloping tracks 84, moving the respective pulley halves 72 and 73 apart. With movement of the cylindrical bearing carrier 79 upwardly, causing the bearing 94 rollers 95 to travel upwardly along the tracks 84, moving the respective pulley halves together.

As set out above, the cylindrical bearing carrier 79 mounts onto the end of cylindrical shaft 74 such that, when the assembly is moved, by the bearing 94 roller 95 traveling along the tracks 84, the cylindrical shaft 74 will be moved also. The pulley halves 72 and 73 are thereby separated or brought together, functioning as described hereinabove with respect to the discussion of FIGS. 1 and 2.

In practice, a depression of the cylindrical bearing carrier 79, against the biasing of coil spring 78, will cause the rollers 95 of bearings 94 to travel down the tracks 84, acting through on the cylindrical shaft 74 to spread apart the pulley halves 72 and 73. Whereas, when a pressure is released from off the cylindrical bearing carrier 79 the coil spring 78 acts to move the rollers 95 of the bearings 94 back up the tracks 84, returning the pulley halves 72 and 73 to the attitude shown in FIG. 1.

Actuation devices 20 and 70, as set out hereinabove, include, respectively, radiused configurations of roller 51 surface and a radiusing of tracks 84, respectively. In each of these configurations the opposing surface to the roller or track is flat. Accordingly, it should be understood that the invention is in any torque responsive device that provides for travel of opposing surfaces over one another to effect operation thereof, where one of those opposing surfaces is radiused and the other is flat. Accordingly, it should be understood that the invention is not limited to a particular actuation device, as shown and described herein, and includes any torque responsive device where one of the opposing track and bearing surfaces is radiused, within the scope of this disclosure.

While preferred embodiments of my invention in torque responsive actuation devices for a belt drive system have been shown and described herein, it should be understood that the present disclosure is made by way of example only and the invention is suitable for a number of uses, including, but not limited to, a use as a snowmobile clutch system, and the like, and that variations and changes to the torque responsive actuation device as described are possible without departing from the subject matter coming within the scope of the following claims, and a reasonable equivalency thereof, which claims I regard as my invention.

I claim:

1. A torque responsive actuation device comprising, a split pulley having a pair of upper and lower pulley halves forming a V slot therebetween to receive a drive belt; a cylindrical cam cone means maintained to extend outwardly from a center of a top face of said upper pulley half and including a plurality of equally spaced identical right triangle cam sections each including a like sloping cam track that extends along said right triangle hypotenuse side; a shaft means extending from said lower pulley half, through a hub opening formed through said upper pulley half; a carrier means whereto are arranged a plurality of cam follower means that each include a roller bearing means for each said sloping cam track, with said carrier means maintained through a connector means to said lower pulley half, and each said cam follower means roller bearing means includes a roller journaled thereto having a surface that contacts one of said sloping cam tracks, to roll therealong, and either said roller contact surface or said sloping cam track surface is radiused or crested, to be equally curved or sloped downwardly from a highest point or surface of each said sloping cam track to the sides of each said right triangle cam section; and spring biasing means for urging said carrier means away from said upper pulley half top face.

2. A torque responsive actuation device for a belt drive system as recited in claim 1, wherein either the roller contact surface or the sloping cam track surface is formed with a convex surface between said roller sides or said cam track sides to have a radius selected for the cylindrical cam cone cam track slope.

3. A torque responsive actuation device as recited in claim 2, wherein either the roller contact surface or the sloping cam track surface is formed to have a center apex therearound or therealong wherefrom two like, oppositely sloping, flat surfaces slope to the roller sides or the sloping cam track surface sides.

4. A torque responsive actuation device as recited in claim 1, wherein the shaft means is a straight cylindrical shaft connected at its lower end to the pulley lower half, passes through the pulley upper half and connects, at its upper end to the carrier means; and the spring biasing means is a coil spring disposed around said straight cylindrical shaft between said upper pulley half and said carrier means.

5. A torque responsive actuation device as recited in claim 1, wherein the means for connecting the carrier means to the lower pulley half are a plurality of equally spaced piers that each include rods extending axially out of top ends thereof, which said piers are each secured, at their lower ends, to said lower pulley half hub, are each radially equidistant from the center of said lower pulley half and will project at right angles through holes formed in the upper pulley half, with ends of said rods secured to said carrier means at approximately right angles to the undersurface thereof.

6. A torque responsive actuation device for a belt drive system as recited in claim 1, further including spaced holes formed through the carrier means that are identical arcuate slots, are spaced equally from one another, at equal radial distances from the carrier means and are aligned for receiving the right triangle cam sections fitted therein.

7. A torque responsive actuation device as recited in claim 1, wherein the cylindrical cam cone is formed to have a bottom portion for securing to the top face of the upper pulley half.

\* \* \* \* \*